United States Patent
Usui et al.

(10) Patent No.: US 11,952,009 B2
(45) Date of Patent: Apr. 9, 2024

(54) DRIVING FORCE CONTROL SYSTEM FOR VEHICLE

(71) Applicant: TOYOTA JIDOSHA KABUSHIKI KAISHA, Toyota (JP)

(72) Inventors: Kunihiko Usui, Fuji (JP); Keisuke Ushida, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/683,908

(22) Filed: Mar. 1, 2022

(65) Prior Publication Data

US 2022/0281472 A1     Sep. 8, 2022

(30) Foreign Application Priority Data

Mar. 5, 2021    (JP) ................... 2021-035691

(51) Int. Cl.
    *B60W 30/18*      (2012.01)
    *B60W 50/14*      (2020.01)
    (Continued)

(52) U.S. Cl.
    CPC ...... *B60W 50/16* (2013.01); *B60W 30/18172* (2013.01); *B60W 60/001* (2020.02);
    (Continued)

(58) Field of Classification Search
CPC ........... B60W 50/16; B60W 30/18172; B60W 60/001; B60W 2050/143; B60W 2050/146; B60W 2520/105; B60W 2520/26; B60W 2530/16; B60W 2540/10; B60W 2720/26; B60W 30/18145; B60W 2050/0088; B60W 2552/40; B60W 2555/20; B60W 2720/263; B60W 2720/266; B60W 50/14;
(Continued)

(56) References Cited

U.S. PATENT DOCUMENTS

2002/0084127 A1*   7/2002   Kohler ............... B60W 10/04
                                                       180/197
2012/0083981 A1    4/2012   Nihei
(Continued)

FOREIGN PATENT DOCUMENTS

| CN | 106828493 A | * | 6/2017 | ............ B60W 30/14 |
| EP | 0705177 B1 | * | 10/1997 | ............. B60K 28/16 |

(Continued)

OTHER PUBLICATIONS

EP-0705177-B1 translation (Year: 1997).*
EP-0705177-B1 translation (Year: 2022).*
CN-106828493-A translation (Year: 2017).*

*Primary Examiner* — Jeff A Burke
*Assistant Examiner* — Kyle T Johnson
(74) *Attorney, Agent, or Firm* — Dinsmore & Shohl LLP (57) ABSTRACT

A driving force control system that controls a driving force in line with a driver's intension to propel a vehicle on a slippery road surface without wheel slip. A controller is configured to obtain individual relations of a slip ratio on a road surface to parameters including the driving force, a (Continued)

running resistance of the vehicle, and an accelerating force of the vehicle, and to control the driving force based on the obtained relations of the slip ratio to each of said parameters.

18 Claims, 6 Drawing Sheets

(51) Int. Cl.
*B60W 50/16* (2020.01)
*B60W 60/00* (2020.01)

(52) U.S. Cl.
CPC . *B60W 2050/143* (2013.01); *B60W 2050/146* (2013.01); *B60W 2520/105* (2013.01); *B60W 2520/26* (2013.01); *B60W 2530/16* (2013.01); *B60W 2540/10* (2013.01); *B60W 2720/26* (2013.01)

(58) Field of Classification Search
CPC .. B60W 40/1005; B60W 10/06; B60W 10/08; B60W 20/15; B60W 40/10; B60W 2510/0657; B60W 2510/083; B60W 2520/10; B60W 2520/28; B60W 2530/10
See application file for complete search history.

(56) References Cited

U.S. PATENT DOCUMENTS

| | | | |
|---|---|---|---|
| 2015/0217766 A1* | 8/2015 | Kelly | B60W 10/184 701/94 |
| 2016/0082972 A1* | 3/2016 | Fairgrieve | B60W 50/14 701/84 |
| 2016/0221446 A1* | 8/2016 | Suzuki | B60L 58/20 |
| 2016/0281620 A1* | 9/2016 | Nakade | F02D 29/02 |
| 2017/0015323 A1* | 1/2017 | Oguri | B60W 10/08 |
| 2017/0182989 A1* | 6/2017 | Takeda | B60T 8/72 |
| 2019/0248370 A1* | 8/2019 | Cunningham | B60W 30/18018 |
| 2022/0266829 A1* | 8/2022 | Thompson | B60W 50/087 |
| 2022/0281457 A1* | 9/2022 | Usui | B60W 40/1005 |
| 2022/0281472 A1* | 9/2022 | Usui | B60W 30/18172 |

FOREIGN PATENT DOCUMENTS

| | | | | |
|---|---|---|---|---|
| GB | 2546980 A | * | 8/2017 | B60W 10/04 |
| JP | 2007-085207 A | | 4/2007 | |
| JP | 2012-076472 A | | 4/2012 | |
| JP | 2016-522114 A | | 7/2016 | |
| JP | 2017-053768 A | | 3/2017 | |
| WO | WO-2022160783 A1 | * | 8/2022 | B60W 10/06 |

\* cited by examiner

DRIVING FORCE CONTROL SYSTEM FOR VEHICLE

CROSS REFERENCE TO RELATED APPLICATIONS

The present disclosure claims the benefit of Japanese Patent Application No. 2021-035691 filed on Mar. 5, 2021 with the Japanese Patent Office.

BACKGROUND

Field of the Disclosure

Embodiments of the present disclosure relate to the art of a control system for vehicles configured to control a driving force to propel the vehicle in accordance with a road surface condition such as a slip ratio.

Discussion of the Related Art

JP-A-2007-085207 describes a driving force control device of a vehicle in which a prime mover includes an engine and a motor. The driving force control device described in JP-A-2007-085207 controls a driving force delivered to drive wheels in the event of slippage of a drive wheel. Specifically, the driving force control device described in JP-A-2007-085207 is configured to shift an operating mode from a traction control mode in which a driving force is reduced to a wheel speed control mode, when the vehicle travels on a slippery road in which a rolling resistance is large such as a sandy road. In this case, a speed of the drive wheel is adjusted to a predetermined speed so that the driving force is optimized to propel the vehicle on the slippery road surface easily without requiring a complicated operation of the accelerator pedal.

For example, on a sandy road surface or a snow-covered road surface, a friction coefficient is low and hence a slip ratio is high. Therefore, it is difficult to propel the vehicle on the sandy road surface or the snow-covered road surface only by manipulating the accelerator pedal. As described, in order to allow a driver to propel the vehicle on such slippery road surface easily by manipulating the accelerator pedal, the control device taught by JP-A-2007-085207 optimizes the driving force. According to the teachings of JP-A-2007-085207, however, the driver is still required to manipulate the accelerator pedal even when the wheel speed control mode is selected. In addition, a road surface condition changes continuously during propulsion of the vehicle. Therefore, it would be still difficult for the driver to optimize the driving force properly to propel the vehicle on the slippery road surface by manipulating the accelerator pedal, even if the driving force is adjusted in the wheel speed control mode. Consequently, in the worst case, the vehicle would be stalled on the slippery road.

SUMMARY

Aspects of the present disclosure have been conceived noting the foregoing technical problems, and it is therefore an object of the present disclosure to provide a driving force control system that controls a driving force in line with a driver's intension to propel a vehicle on a slippery road surface without wheel slip.

According to the exemplary embodiment of the present disclosure, there is provided a driving force control system for a vehicle that controls a driving force to propel the vehicle in accordance with a road surface condition. In order to achieve the above-explained objective, a controller of the control system is configured to: obtain individual relations of a slip ratio on a road surface on which the vehicle travels to parameters including the driving force, a running resistance of the vehicle, and an accelerating force of the vehicle; and control the driving force based on the obtained relations of the slip ratio to each of the parameters.

In a non-limiting embodiment, an operating mode of the vehicle may include a plurality of modes to propel the vehicle in different manners. In addition, the controller may be further configured to: detect the operating mode selected by a driver; calculate a target slip ratio in accordance with the detected operating mode; and control the driving force based on the calculated target slip ratio.

In a non-limiting embodiment, the vehicle may comprise an accelerator pedal that is operated to change the driving force, and the controller may be further configured to instruct the driver how to operate an accelerator pedal to control the driving force.

In a non-limiting embodiment, the controller may be further configured to instruct the driver to depress the accelerator pedal when a current slip ratio on the road surface is less than the target slip ratio.

In a non-limiting embodiment, the controller may be further configured to instruct the driver to return the accelerator pedal when a current slip ratio on the road surface is greater than the target slip ratio.

In a non-limiting embodiment, the controller may be further configured to instruct the driver how to operate an accelerator pedal visually, acoustically or physically.

In a non-limiting embodiment, an operating mode of the vehicle may include an autonomous mode in which the driving force is controlled autonomously without requiring the driver to operate the accelerator pedal. In addition, the controller may be further configured to control the driving force autonomously based on the target slip ratio during propulsion in the autonomous mode.

In a non-limiting embodiment, the controller may be further configured to reduce a difference in the slip ratios among wheels to a predetermined value or less when the vehicle turns.

In a non-limiting embodiment, the controller may be further configured to: update the relations of the slip ratio to the driving force, the running resistance, and the accelerating force continuously during propulsion of the vehicle; and control the driving force based on the updated relations.

Thus, according to the exemplary embodiment of the present disclosure, the control system controls the driving force to propel the vehicle in accordance with the road surface condition. To this end, the control system is configured to obtain the relations of the slip ratio to the driving force, the running resistance, and the accelerating force, and controls the driving force based on the relations of the slip ratio to those parameters. In addition, the control system is further configured to calculate the target driving force possible to achieve the target slip ratio in the selected operating mode, and the driving force is controlled based on the target driving force. According to the exemplary embodiment of the present disclosure, therefore, the driving force and the acceleration can be controlled in the intended manner to propel the vehicle on the slippery road surface without wheel slip.

In addition, when the vehicle is propelled in a manual mode, the control system instructs the driver how to operate the accelerator pedal to achieve the target driving force. In this case, if the accelerator pedal is not depressed enough to generate the target driving force to achieve the target slip ratio, the driver is instructed to depress the accelerator pedal. By contrast, if the accelerator pedal is depressed more than required to generate the target driving force to achieve the target slip ratio, the driver is instructed to return the accelerator pedal. According to the exemplary embodiment of the present disclosure, therefore, the driver is allowed to operate the accelerator pedal more accurately and properly to achieve the target slip ratio. For this reason, the vehicle can be propelled on the slippery road surface without wheel slip.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION

Embodiments of the present disclosure will now be explained with reference to the accompanying drawings. Note that the embodiments shown below are merely examples of the present disclosure, and do not limit the present disclosure.

The driving force control system according to the embodiment of the present disclosure is applied to vehicles having at least one of a motor and an engine serving as a prime mover. For example, the driving force control system according to the embodiment of the present disclosure may be applied to an electric vehicle in which only a motor serves as the prime mover, and a hybrid vehicle in which a prime mover includes an engine and a motor. The electric vehicle includes a battery electric vehicle in which only a motor is employed as a prime mover, and a range extender electric vehicle in which an engine is operated only to generate electricity. In addition, the driving force control system may also be applied to a plug-in electric vehicle, a plug-in hybrid vehicle, and a fuel-cell vehicle.

A vehicle Ve to which the control system according to the exemplary embodiment of the present disclosure is applied may be operated autonomously. Specifically, the control system is configured to execute a starting operation, an accelerating operation, a steering operation, a braking operation, a stopping operation etc. of the vehicle Ve autonomously, while recognizing and observing an external condition and a travelling condition. For example, an operating mode of the vehicle Ve may be switched between an autonomous mode and a manual mode by manipulating a dedicated switch.

Figure 1:
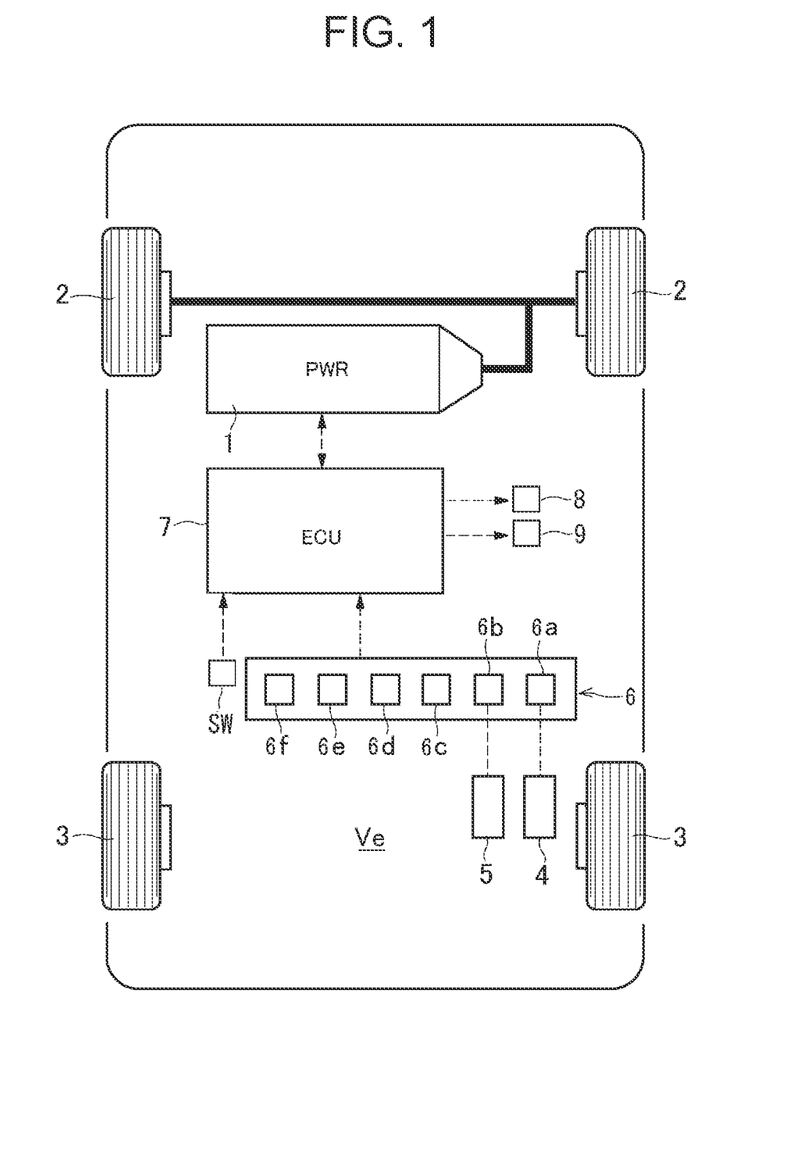
FIG. 1 is a schematic illustration showing one example of a structure of a vehicle to which the control system according to the embodiment of the present disclosure is applied.

Referring now to FIG. 1, there is shown an example of a drive system of the vehicle Ve to which the driving force control system according to the exemplary embodiment of the present disclosure is applied. The vehicle Ve comprises a prime mover (referred to as "PWR" in FIG. 1) 1, a pair of front wheels 2, a pair of rear wheels 3, an accelerator pedal 4, a brake pedal 5, a detector 6, and an electronic control unit (to be abbreviated as the "ECU" hereinafter) 7 as a controller.

The prime mover 1 generates a drive torque to establish a driving force to propel the vehicle Ve. For example, an internal combustion engine such as a gasoline engine and a diesel engine may be adopted as the prime mover 1. An output power of the engine may be adjusted electrically, and the engine may be started and stopped electrically according to need. Given that the gasoline engine is adopted as the prime mover 1, an opening degree of a throttle valve, an amount of fuel supply or fuel injection, a commencement and a termination of ignition, an ignition timing etc. may be controlled electrically. Otherwise, given that the diesel engine is adopted as the prime mover 1, an amount of fuel injection, an injection timing, an opening degree of a throttle valve of an EGR (Exhaust Gas Recirculation) system etc. may be controlled electrically.

Further, a permanent magnet type synchronous motor and an induction motor may also be adopted as the prime mover 1. Those kinds of motors may serve not only as a motor to generate torque when driven by electricity suppled thereto, but also as a generator to generate electricity when rotated by a torque applied thereto. That is, a motor-generator may also be adopted as the prime mover 1. In this case, the motor serving as prime mover 1 is electrically connected with a battery through an inverter (neither of which are shown) so that the motor is switched between a motor and a generator by electrically controlling the prime mover 1. Specifically, the motor is operated as a motor by supplying electricity thereto from the battery, and electricity generated by the motor serving as a generator may be accumulated in the battery.

In the vehicle Ve shown in FIG. 1, the front wheels 2 serve as drive wheels, and a drive torque generated by the prime mover 1 is delivered to the front wheels 2 to establish a driving force. However, the driving force control system according to the embodiment of the present disclosure may also be applied to a rear-drive layout vehicle in which the rear wheels 3 serve as drive wheels, and a four-wheel drive vehicle in which all of the wheels 2 and 3 are driven by the torque of the prime mover 1. As an option, a transmission (not shown) may be arranged downstream of the prime mover 1 to deliver the output torque of the prime mover 1 to the drive wheels via the transmission.

The driving force to propel or accelerate the vehicle Ve is changed in accordance with a position of the accelerator pedal 4 that is manipulated by a driver. Specifically, the drive torque of the prime mover 1 is increased in accordance with an increase in depression (or an operating amount) of the accelerator pedal 4 thereby increasing the driving force to propel the vehicle Ve. By contrast, the drive torque of the prime mover 1 is reduced by returning the accelerator pedal 4. In other words, the drive torque of the prime mover 1 is reduced with a reduction in depression of the accelerator pedal 4 thereby reducing the driving force to propel the vehicle Ve. Given that the motor is adopted as the prime mover 1, a regenerative braking force derived from a regenerative torque of the motor is applied to the vehicle Ve when the accelerator pedal 4 is returned. By contrast, given that the engine is adopted as the prime mover 1, an engine braking force derived from a friction torque and a pumping loss is applied to the vehicle Ve when the accelerator pedal 4 is returned.

The braking force applied to the vehicle Ve is changed by manipulating the brake pedal 5. For example, a hydraulic disc brake and a drum brake may be adopted as a brake device, and the brake device is actuated to establish a braking force by depressing the brake pedal 5. Given that a one-pedal mode is available in the vehicle Ve, the vehicle Ve may be accelerated and decelerated only by manipulating the accelerator pedal 4 in accordance with a position of the accelerator pedal 4. In this case, the brake device may be controlled in conjunction with an operation of the accelerator pedal 4.

The detector 6 collects data about conditions of the vehicle Ve including a condition of the accelerator pedal 4. Specifically, the detector 6 comprises: an accelerator position sensor 6a that detects a position (i.e., depression) of the accelerator pedal 4; a brake stroke sensor 6b that detects an operating amount (i.e., stroke or depression) of the brake pedal 5; a vehicle speed sensor 6c that detects a speed of the vehicle Ve; a wheel speed sensor 6d that detects speeds of the front wheels 2 and the rear wheels 3; an acceleration sensor 6e that detects a longitudinal acceleration of the vehicle Ve; and a speed sensor 6f that detects a speed of an output shaft of the prime mover 1. The detector 6 is electrically connected to the ECU 7 so that the data collected by those sensors are transmitted to the ECU 7 in the form of electric signal.

The ECU 7 comprises a microcomputer as its main constituent. As described, the data collected by the detector 6 is sent to the ECU 7 to control the vehicle Ve, and the ECU 7 performs calculation using the incident data transmitted from the detector 6 as well as data and formulas stored in advance. Calculation results are transmitted from the ECU 7 in the form of command signal.

Specifically, the ECU 7 calculates a target drive torque to be generated by the prime mover 1 and a target acceleration (or deceleration) of the vehicle Ve based on the data transmitted from the accelerator position sensor 6a, and transmits the calculated target drive torque to the prime mover 1 in the form of command signal so as to control an output power of the prime mover 1. The ECU 7 also controls the driving force to propel the vehicle Ve or the braking force to decelerate the vehicle Ve in such a manner as to achieve the target acceleration or deceleration calculated based on a state of the accelerator pedal 4 or the brake pedal 5. Although only one ECU 7 is depicted in FIG. 1, a plurality of ECUs may be arranged in the vehicle Ve to control the specific devices individually.

When travelling on a slippery road surface such as a sandy road surface, a muddy road surface, or a snow-covered road surface, the driver is required to operate the accelerator pedal 4 in a different manner to propel the vehicle Ve without wheel slip. In this situation, the driver would depress the accelerator pedal 4 more than necessary or less than necessary, and the driving force would not be optimized properly to propel the vehicle. Consequently, in the worst case, the vehicle would be stalled on the slippery road surface.

Figure 2:
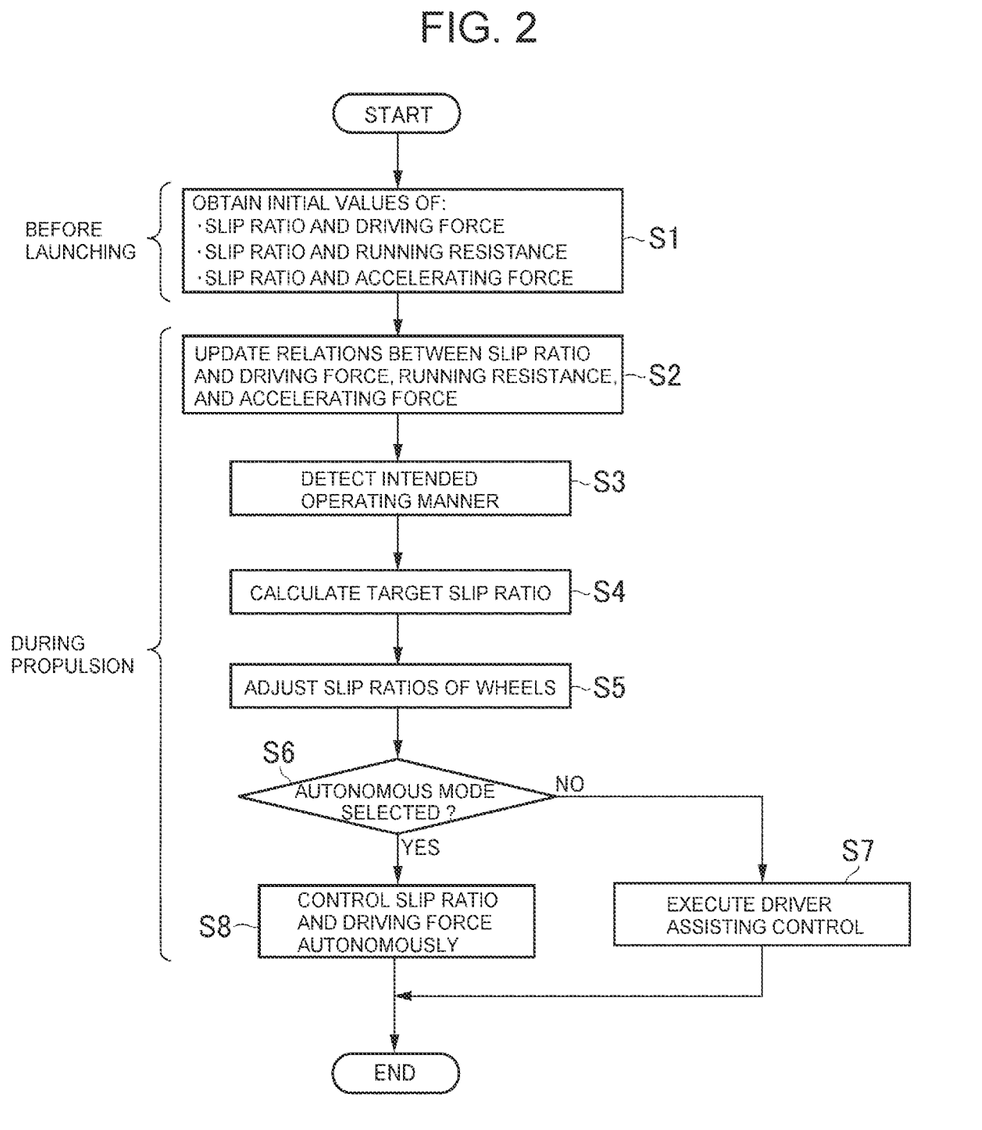
FIG. 2 is a flowchart showing one example of a routine executed by the control system according to the exemplary embodiment of the present disclosure.

In order to control the driving force properly in line with the driver's intension to propel the vehicle Ve on the slippery road surface, the ECU 7 executes a routine shown in FIG. 2 repeatedly at predetermined time intervals.

At step S1, before launching the vehicle Ve, the ECU 7 obtains initial values of: a relation between a slip ratio on a road surface and a driving force; a relation between the slip ratio and a running resistance, and a relation between the slip ratio and an accelerating force. If the vehicle Ve has travelled on the road surface on which the vehicle Ve plans to travel in the past, learned values of the above-mentioned parameters has already been stored in the ECU 7. When launching the vehicle Ve, therefore, a subroutine shown in FIG. 3 is executed to determine whether the learned values of the slip ratio, the driving force, the running resistance, and the accelerating force on the road surface on which the vehicle Ve planes to travel are available.

Figure 3:
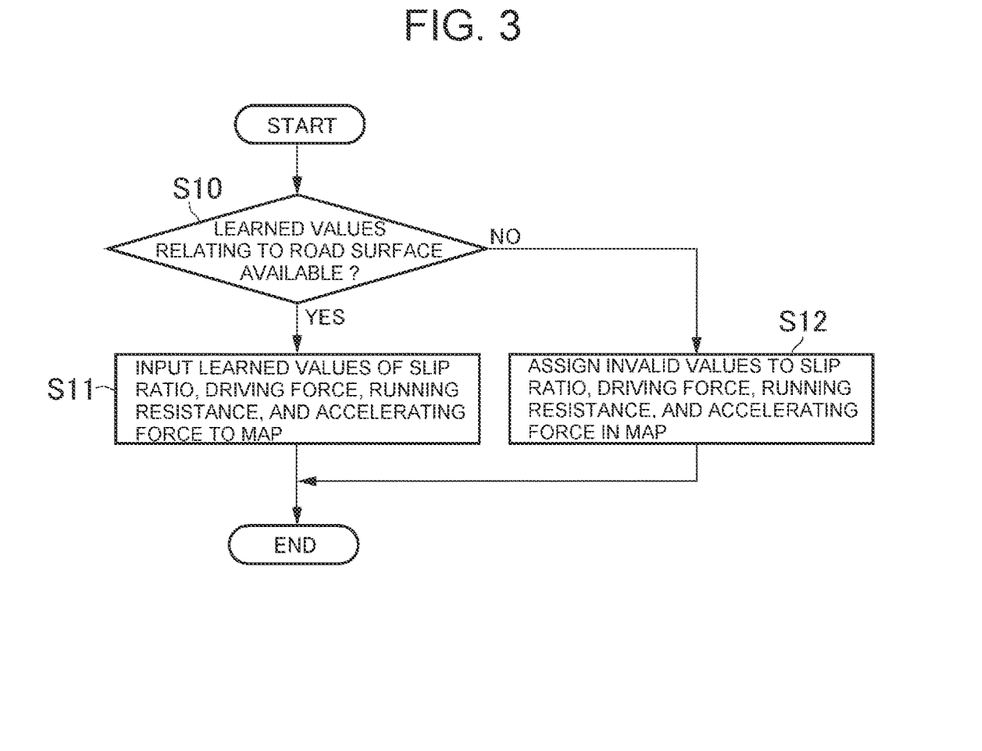
FIG. 3 is a flowchart showing one example of a subroutine for determining availability of learned values about road surface condition.
Figure 4:
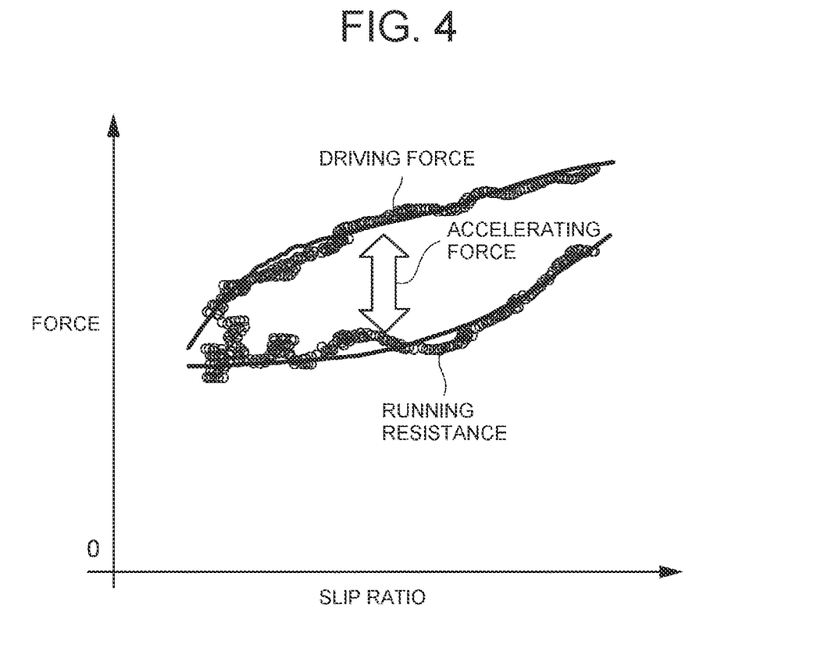
FIG. 4 is a map determining relations of a slip ratio to a driving force, an accelerating force, and a running resistance.

In the subroutine shown in FIG. 3, at step S10, it is determined whether the learned values relating to the road surface on which the vehicle Ve plans to travel are available. As described, if the vehicle Ve has travelled on the road surface on which the vehicle Ve will travel in the past, data about the slip ratio, the driving force, the running resistance, and the accelerating force collected when the vehicle Ve travelled on the road surface are stored in the ECU 7 or the external server. In order to determine the respective relations of the slip ratio to the driving force, the running resistance, and the accelerating force, a map shown in FIG. 4 is installed in the ECU 7 or the external server. If the learned values relating to the road surface on which the vehicle Ve will travel are available so that the answer of step S10 is YES, the routine progresses to step S11 to input the learned values of the slip ratio, the driving force, the running resistance, and the accelerating force to the map shown in FIG. 4. Thereafter, the routine returns.

By contrast, if the learned values relating to the road surface on which the vehicle Ve will travel are not available so that the answer of step S10 is NO, the routine progresses to step S12 to assign invalid values to all of the parameters of the map shown in FIG. 4. Thereafter, the routine returns.

Turning back to FIG. 2, at step S2, the relation between the slip ratio and the driving force; the relation between the slip ratio and the running resistance; and the relation between the slip ratio and the accelerating force, are updated respectively. According to the exemplary embodiment of the present disclosure, the above-mentioned data about the road surface is continuously collected and updated during propulsion of the vehicle Ve.

Figure 5:
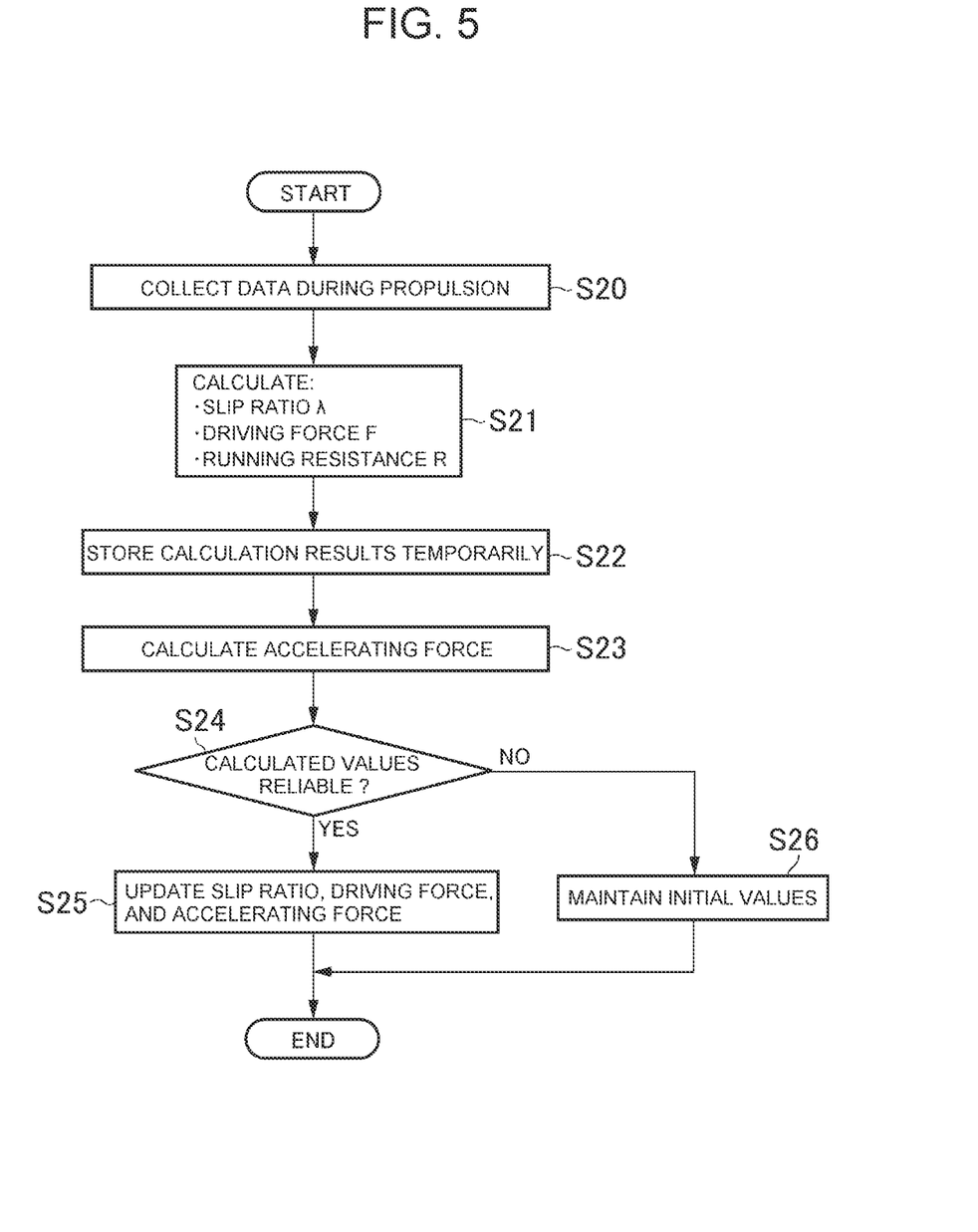
FIG. 5 is a flowchart showing one example of a subroutine for updating data relating to the road surface condition.

Turning to FIG. 5, there is shown a subroutine that is executed simultaneously with step S2 to update the above-mentioned data about the road surface. At step S20, data necessary to calculate a slip ratio λ of the road surface, a driving force F, a running resistance R, and an accelerating force AF are collected during propulsion of the vehicle Ve. To this end, for example, a wheel speed Vw, a vehicle speed V, and an acceleration "a" are collected by the vehicle speed sensor 6c, the wheel speed sensor 6d, and the acceleration sensor 6e.

At step S21, the slip ratio λ, the driving force F, and the running resistance R are calculated based on the data collected at step S20. Specifically, the slip ratio λ of the road surface may be calculated by dividing a difference of the wheel speed Vw and the vehicle speed V by the wheel speed Vw or the vehicle speed V whichever is greater. For example, given that the vehicle speed V is greater than the wheel speed Vw, the slip ratio λ may be expressed as:

$$\lambda = (V_w - V)/V.$$

The driving force F may be calculated by converting a torque of the prime mover 1 into the driving force F. For example, the driving force F may be calculated by dividing a torque of a driveshaft by a radius of a tire. Otherwise, the driving force F may also be calculated by dividing a product of a required driving force and a gear ratio of a differential by a radius of a tire.

The running resistance R includes a grade resistance, a rolling resistance, and an air resistance, and the running resistance R may be calculated by subtracting a product of a weight M and an acceleration "a" of the vehicle Ve from the driving force F as expressed by the following expression:

$$R=F-M \cdot a.$$

At step S22, the slip ratio Δ, the driving force F, and the running resistance R calculated at step S21 are temporarily stored as buffers.

At step S23, the accelerating force AF is calculated. The accelerating force AF may be calculated based on a difference between the driving force F and the running resistance R. For example, the accelerating force AF may be obtained with reference to a map shown in FIG. 4. In this case, the driving force F and the running resistance R with respect to the slip ratio λ are approximated into quadratic curves by the method of least squares, and the accelerating force AF is determined based on a difference between the driving force F and the running resistance R. Instead, the accelerating force AF may also be calculated based on a difference between the driving force F and the running resistance R calculated using the above-mentioned formulas.

At step S24, it is determined whether the slip ratio Δ, the driving force F, the running resistance R calculated at step S21, and the accelerating force AF calculated at step S23 are reliable enough to update those parameters. For example, such determination at step S23 may be made with reference to the map shown in FIG. 4. In this case, given that the data plotted as the approximated curves in FIG. 4 between predetermined slip ratios was collected while depressing the accelerator pedal 4 continuously for a predetermined period of time or longer, and that an amount of the data plotted as the approximated curves in FIG. 4 between predetermined slip ratios is a predetermined amount or greater, values of the above-mentioned parameters calculated at steps S21 and S23 are determined as reliable. By contrast, given that the data plotted as the approximated curves in FIG. 4 concentrates only within a lower range or higher range of the slip ratio, values of the above-mentioned parameters calculated at steps S21 and S23 are not reliable enough.

Specifically, each of the driving force F, the running resistance R, and the accelerating force AF may be expressed as a quadratic function "$ax^2+bx+c$". Therefore, instead of the above-explained procedure, the calculation values at steps S21 and S23 may also be determined as reliable if the following conditions are satisfied. Specifically, if the driving force F calculated at step S21 satisfies all of the following inequalities "$a<0$, $-b/2a>1$, and $c>0$", the approximated curve of the driving force F opens downwardly, and the driving force F calculated at step S21 is determined as reliable. Likewise, if the running resistance R calculated at step S21 satisfies all of the following inequalities "$a>0$, $-b/2a<0$, and $c>0$", the approximated curve of the running resistance R opens upwardly, and the running resistance R calculated at step S21 is determined as reliable. Further, if the accelerating force AF calculated at step S23 satisfies all of the following inequalities "$a<0$, $-b/2a>1$, and $c>0$", the approximated curve of the accelerating force AF opens downwardly, and the accelerating force AF calculated at step S23 is determined as reliable.

If the slip ratio Δ, the driving force F, the running resistance R calculated at step S21, and the accelerating force AF calculated at step S23 are reliable enough so that the answer of step S24 is YES, the routine progresses to step S25 to update those parameters to the values calculated at steps S21 and S23. By contrast, if the slip ratio λ, the driving force F, the running resistance R calculated at step S21, and the accelerating force AF calculated at step S23 are not reliable enough so that the answer of step S24 is NO, the routine progresses to step S26 to maintain those parameters to the initial values. Thus, according to the exemplary embodiment of the present disclosure, the relations of the slip ratio to the driving force, the running resistance, and the accelerating force are learnt during propulsion of the vehicle Ve so that the road surface conditions are continuously updated.

Turning back to FIG. 2, at step S3, an intended manner of operation of the vehicle Ve or a selected operating mode of the vehicle Ve is detected. According to the exemplary embodiment of the present disclosure, the vehicle Ve may be propelled in an off-road mode when travelling on a rough or slippery road surface. In this case, the off-road mode may be selected from a mud & sand mode, a loose rock mode, a mogul mode, and a rock mode depending on a road surface condition by manipulating a mode selector switch SW. In this case, therefore, the operating mode currently selected by the driver is detected at step S3. Whereas, in a case that the vehicle Ve is propelled in the autonomous mode or the manual mode, a target acceleration, a target vehicle speed, a target driving force and so on may be set manually or selected from a high mode, a normal mode, and a low mode, by manipulating e.g., an on-board display, a smartphone or the like. In this case, therefore, a manner of operation of the vehicle Ve intended by the driver is detected at step S3.

Figure 6:
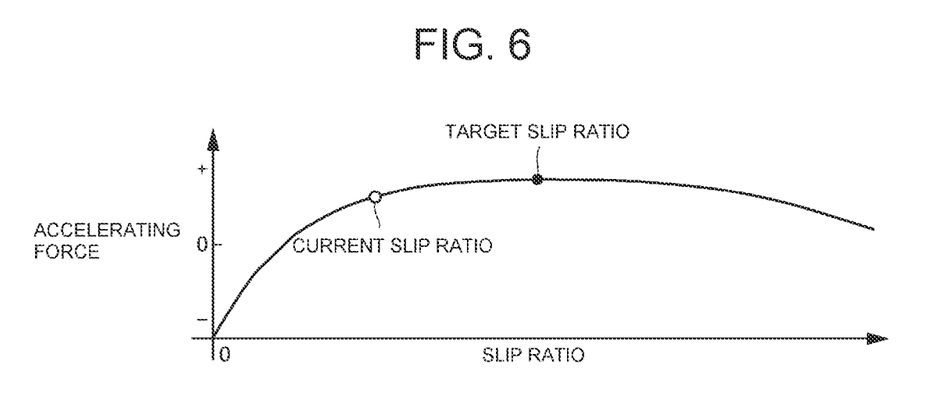
FIG. 6 is a map for determining a target slip ratio.

Then, the routine progresses to step S4 to calculate a target slip ratio possible to fulfill the intended manner of operation detected at step S3. Specifically, the target slip ratio is calculated based on a type of the vehicle Ve, a grain size of covering the road surface, an amount of moisture on the road surface, and a friction coefficient on the road surface. Instead, the target slip ratio may also be calculated with reference to a map shown in FIG. 6 determining a relation between the accelerating force or the driving force and the slip ratio. For example, on the sandy road surface, a running resistance is greater than that on a paved road. Therefore, in order to prevent wheel slip, the target slip ratio is increased when travelling on the sandy road surface. Specifically, the slip ratio possible to establish a maximum driving force on the paved road is approximately 0.2. Whereas, on the sandy road surface, the slip ratio possible to establish a maximum driving force is approximately 0.4. In FIG. 6, "○" indicates a current slip ratio, and "●" indicates a target slip ratio.

At step S5, the slip ratio of each of the wheels 2 and 3 is adjusted. When the vehicle Ve travels straight ahead, slip ratios of all of the front wheels 2 and the rear wheels 3 are set to a same value. Whereas, when the vehicle Ve turns, right wheels and left wheels are rotated at different speeds. In this situation, therefore, the slip ratios of the wheels required to establish the maximum driving forces would be changed, and predetermined wheel(s) may establish the maximum driving force(es) but remaining wheel(s) may not establish the maximum driving force(es). For example, the pair of front wheels 2 may establish the maximum driving forces, but the pair of rear wheels 3 may not establish the maximum driving forces. At step S5, therefore, the slip ratios of the front wheels 2 and the rear wheels 3 are optimized to establish the maximum driving force to propel the vehicle Ve.

Figure 7:
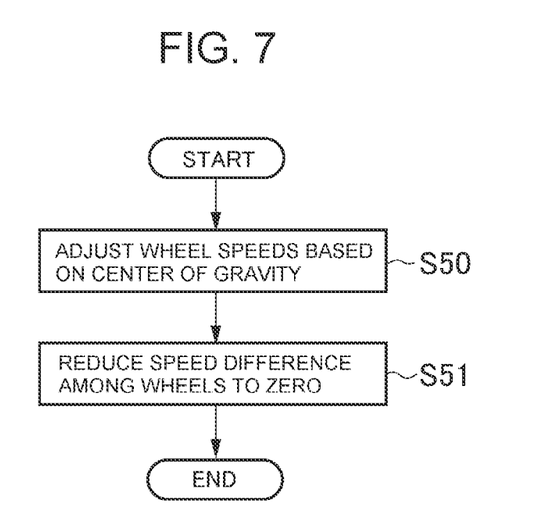
FIG. 7 is a flowchart showing one example of a subroutine for optimizing slip ratios of wheels.

Turning to FIG. 7, there is shown a subroutine that is executed simultaneously with step S5 to reduce a speed difference among the front wheels 2 and the rear wheels 3 to a predetermined value or less. That is, an adjustment control or a correction control is executed at step S5 to convert actual speeds of the wheels into a common hypothetical speed based on an assumption that all of the wheels are positioned at the center of gravity of the vehicle Ve. Specifically, at step S50 of the subroutine shown in FIG. 7, speeds of the front wheels 2 and the rear wheels 3 are converted into a common speed possible to establish the maximum driving force to propel the vehicle Ve at a current position of the center of gravity of the vehicle Ve. When the vehicle Ve turns, inner wheels and outer wheels rotate at different speed. Given that the vehicle Ve is a four-wheel layout vehicle having a center differential unit, rotational speeds of the wheels are also changed between the front wheels 2 and the rear wheels 3. For example, when the vehicle Ve turns to the left, a turning radius of the left rear wheel 3 is the shortest and hence the left rear wheel 3 is rotated at the lowest speed. By contrast, a turning radius of the right front wheel 2 is the longest and hence the right front wheel 2 is rotated at the highest speed. That is, when the vehicle Ve turns, the slip ratios of the wheels are different from one another and hence the maximum driving force of the vehicle Ve may not be established based on the target slip ratio calculated at step S4. At step S50, therefore, speeds of the front wheels 2 and the rear wheels 3 are adjusted to a common target speed possible to establish the maximum driving force to propel the vehicle Ve at a current position of the center of gravity of the vehicle Ve. Instead, the common target speed of the wheels may also be set based on a predetermined position of the vehicle Ve.

Then, at step S51, a speed difference among the front wheels 2 and the rear wheels 3 is reduced to zero or less than a predetermined value. That is, speeds of the front wheels 2 and the rear wheels 3 are adjusted to the common target speed calculated at step S50. For example, the speed difference among the front wheels 2 and the rear wheels 3 may be reduced by the brake device. Instead, the speed difference among the front wheels 2 and the rear wheels 3 may be reduced by changing a power distribution ratio to the front wheels 2 and the rear wheels 3 by a torque vectoring device, a coupling device, a clutch device or the like. Consequently, the slip ratios of the front wheels 2 and the rear wheels 3 are substantially equalized to one another.

Turning back to FIG. 2, at step S6, it is determined whether the autonomous mode is currently selected. As described, according to the exemplary embodiment of the present disclosure, the vehicle Ve to which the control system is applied may be operated not only manually but also autonomously, and the control system is configured to propel the vehicle Ve on the slippery road surface without wheel slip.

If the vehicle Ve is propelled in the manual mode so that the answer of step S6 is NO, the routine progresses to step S7 to execute a driver assisting control to achieve the target slip ratio optimized at step S5. In this case, specifically, the driver is instructed to operate the accelerator pedal 4 visually, phonically, acoustically or physically in such a manner as to generate a target acceleration and a target driving force required to achieve the target slip ratio optimized at step S5. Consequently, the vehicle Ve is propelled in the intended manner detected at step S3 without wheel slip. For example, if the accelerator pedal 4 is not depressed enough to generate the target acceleration and the target driving force to achieve the target slip ratio, an instruction message to urge the driver to depress the accelerator pedal 4 is indicated in a headup display 8 shown in FIG. 8. By contrast, if the accelerator pedal 4 is depressed more than required to generate the target acceleration and the target driving force to achieve the target slip ratio, an instruction message to urge the driver to return the accelerator pedal 4 is indicated in a headup display 8.

Figure 8:
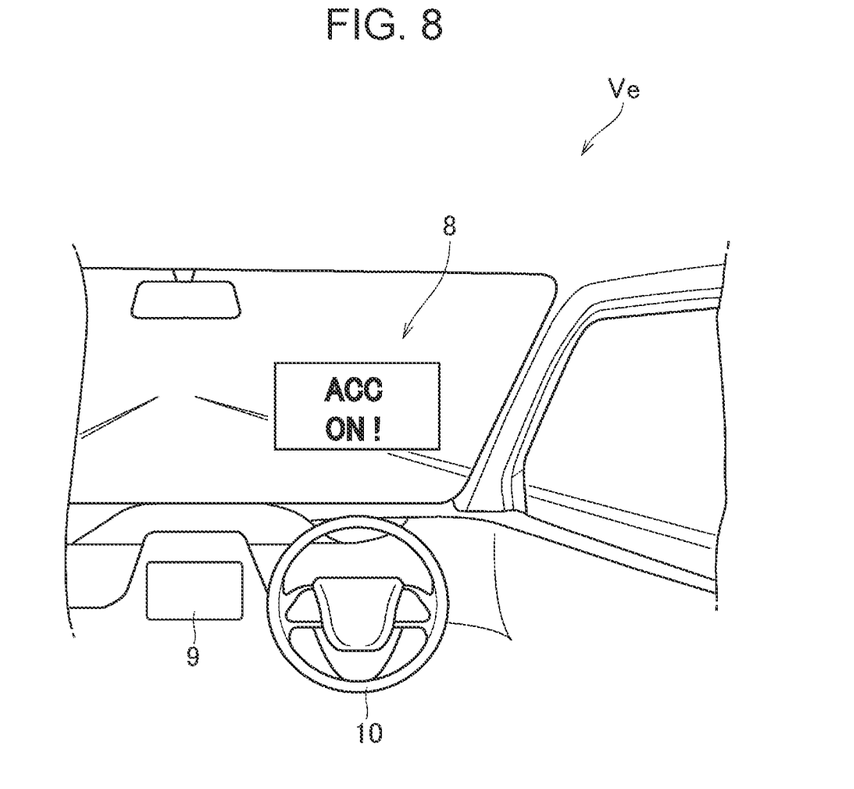
FIG. 8 is a schematic illustration showing one example of an indicator indicating an instruction message.

Such instruction message may also be indicated in a human-machine interface 9 that offers information to driver and that is operated by the driver. Otherwise, such instruction message may also be transmitted to the driver phonically by a voice message or acoustically by a sound or tone. Further, such instruction message may also be transmitted physically to the driver by vibrating a steering wheel 10 or a seat.

In addition, in order to assist the driver to operate the accelerator pedal 4 more effectively, a difference between the target slip ratio calculated at step S4 and the current slip ratio may also be indicated in the human-machine interface 9. By thus visualizing the target slip ratio calculated and the current slip ratio, the driver is allowed to operate the accelerator pedal 4 more accurately and properly to achieve the target slip ratio. Specifically, if the current slip ratio is less than the target slip ratio, the driver is instructed to depress the accelerator pedal 4. By contrast, if the current slip ratio is greater than the target slip ratio, the driver is instructed to return the accelerator pedal 4.

After executing the driver assisting control at step S7, the routine shown in FIG. 2 returns. Here, it is to be noted that the routine shown in FIG. 2 returns even if the driver does not operate the accelerator pedal 4 in line with the instruction transmitted at step S7, and the routine is repeated from step S1.

Figure 9:
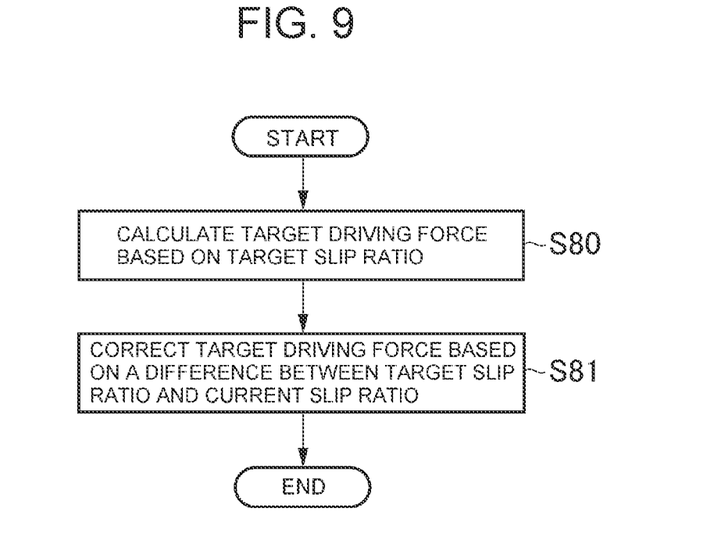
FIG. 9 is a flowchart showing one example of a subroutine for correcting a target driving force.

If the vehicle Ve is propelled in the autonomous mode so that the answer of step S6 is YES, the routine progresses to step S8 to control the slip ratio and the driving force autonomously. In this case, specifically, the driving force to propel the vehicle Ve is controlled autonomously to achieve the target slip ratio without requiring the driver to operate the accelerator pedal 4. Turning to FIG. 9, there is shown a subroutine that is executed simultaneously with step S8 to control the driving force autonomously to achieve the target slip ratio. At step S80, a target driving force is calculated based on the target slip ratio. For example, the target driving force may be calculated by a feedforward method based on the slip ratio calculated at step S4.

Then, at step S81, the target driving force is corrected based on a difference between the target slip ratio and the current slip ratio by a feedback method, and the torque of the prime mover 1 is controlled to achieve the corrected target driving force.

Thus, the control system according to the exemplary embodiment of the present disclosure controls the driving force to propel the vehicle Ve in accordance with the road surface condition. To this end, the control system is configured to obtain the relations between the slip ratio $\lambda$ and the driving force F, the running resistance R, and the accelerating force AF, and to update those relations repeatedly during propulsion of the vehicle Ve. According to the exemplary embodiment of the present disclosure, therefore, the driving force and the acceleration can be controlled in the intended manner to propel the vehicle Ve on the slippery road surface without wheel slip. To this end, when the vehicle Ve is propelled in the manual mode, the control system instructs the driver how to operate the accelerator pedal 4 to achieve the target driving force. For example, if the accelerator pedal 4 is not depressed enough to generate the target driving force to achieve the target slip ratio, an instruction message to urge the driver to depress the accelerator pedal 4 is indicated. By contrast, if the accelerator pedal 4 is depressed more than required to generate the target driving force to achieve the target slip ratio, an instruction message to urge the driver to return the accelerator pedal 4 is indicated. In addition, a difference between the target slip ratio and the current slip ratio may also be indicated. According to the exemplary embodiment of the present disclosure, therefore, the driver is allowed to operate the accelerator pedal 4 more accurately and properly to achieve the target slip ratio. For this reason, the vehicle Ve can be propelled on the slippery road surface such as a sandy road surface, a muddy road surface, and a snow-covered road surface without wheel slip.

Whereas, when the vehicle Ve is propelled in the autonomous mode, the control system controls the driving force to propel the vehicle Ve autonomously to achieve the target slip ratio without requiring the driver to operate the accelerator pedal 4. According to the exemplary embodiment of the present disclosure, therefore, the vehicle Ve may also be propelled on the slippery road surface without wheel slip even in the autonomous mode.

Although the above exemplary embodiments of the present disclosure have been described, it will be understood by those skilled in the art that the present disclosure should not be limited to the described exemplary embodiments, and various changes and modifications can be made within the scope of the present disclosure. For example, the routine shown in FIG. 2 may also be executed by the external server or terminal instead of the ECU 7. In this case, not only newly manufactured vehicles but also vehicles already in use may be controlled to travel on the slippery road surface without wheel slip.

What is claimed is:

1. A driving force control system for a vehicle that controls a driving force to propel the vehicle in accordance with a road surface condition, comprising:
a controller that controls the driving force, the controller is configured to:
obtain individual relations of a slip ratio on a road surface on which the vehicle travels to parameters including the driving force, a running resistance of the vehicle, and an accelerating force of the vehicle,
control the driving force based on the obtained relations of the slip ratio to each of the parameters,
determine reliability of each of the parameters based on collecting data for a predetermined period of time that is relative to an approximated curve, and
update, based on determining the reliability, each of the parameters to predetermined values.

2. The driving force control system for the vehicle as claimed in claim 1,
wherein an operating mode of the vehicle includes a plurality of modes to propel the vehicle in different manners, and
the controller is further configured to
detect the operating mode selected by a driver,
calculate a target slip ratio in accordance with the detected operating mode, and
instruct the driver to control the driving force based on the calculated target slip ratio.

3. The driving force control system for the vehicle as claimed in claim 2,
wherein the vehicle comprises an accelerator pedal that is operated to change the driving force, and
the controller is further configured to instruct the driver how to operate the accelerator pedal to control the driving force.

4. The driving force control system for the vehicle as claimed in claim 3, wherein the controller is further configured to instruct the driver to depress the accelerator pedal when a current slip ratio on the road surface is less than the target slip ratio.

5. The driving force control system for the vehicle as claimed in claim 3, wherein the controller is further configured to instruct the driver to return the accelerator pedal when a current slip ratio on the road surface is greater than the target slip ratio.

6. The driving force control system for the vehicle as claimed in claim 3, wherein the controller is further configured to instruct the driver how to operate the accelerator pedal visually, acoustically or physically.

7. The driving force control system for the vehicle as claimed in claim 3,
wherein the operating mode of the vehicle includes an autonomous mode in which the driving force is controlled autonomously without requiring the driver to operate the accelerator pedal, and
the controller is further configured to control the driving force autonomously based on the target slip ratio during propulsion in the autonomous mode.

8. The driving force control system for the vehicle as claimed in claim 1, wherein the controller is further configured to reduce a difference in the slip ratios among wheels to a predetermined value or less when the vehicle turns.

9. The driving force control system for the vehicle as claimed in claim 1, wherein the controller is further configured to
update the relations of the slip ratio to the driving force, the running resistance, and the accelerating force continuously during propulsion of the vehicle, and
control the driving force based on the updated relations.

10. A driving force control system fora vehicle that controls a driving force to propel the vehicle in accordance with a road surface condition, comprising:
a controller that controls the driving force, the controller is configured to:
obtain individual relations of a slip ratio on a road surface on which the vehicle travels to parameters including the driving force, a running resistance of the vehicle, and an accelerating force of the vehicle,
control the driving force based on the obtained relations of the slip ratio to each of the parameters
determine availability of learned values of each of the parameters for the vehicle having travelled on the road surface on which the vehicle will travel, and
input, based on determining the availability, the learned values of each of the parameters into a map.

11. The driving force control system for the vehicle as claimed in claim 10,
wherein an operating mode of the vehicle includes a plurality of modes to propel the vehicle in different manners, and
the controller is further configured to
detect the operating mode selected by a driver,
calculate a target slip ratio in accordance with the detected operating mode, and instruct the driver to control the driving force based on the calculated target slip ratio.

12. The driving force control system for the vehicle as claimed in claim 11,
wherein the vehicle comprises an accelerator pedal that is operated to change the driving force, and
the controller is further configured to instruct the driver how to operate the accelerator pedal to control the driving force.

13. The driving force control system for the vehicle as claimed in claim 12, wherein the controller is further configured to instruct the driver to depress the accelerator pedal when a current slip ratio on the road surface is less than the target slip ratio.

14. The driving force control system for the vehicle as claimed in claim 12, wherein the controller is further configured to instruct the driver to return the accelerator pedal when a current slip ratio on the road surface is greater than the target slip ratio.

15. The driving force control system for the vehicle as claimed in claim 12, wherein the controller is further configured to instruct the driver how to operate the accelerator pedal visually, acoustically or physically.

16. The driving force control system for the vehicle as claimed in claim 12,
wherein the operating mode of the vehicle includes an autonomous mode in which the driving force is controlled autonomously without requiring the driver to operate the accelerator pedal, and
the controller is further configured to control the driving force autonomously based on the target slip ratio during propulsion in the autonomous mode.

17. The driving force control system for the vehicle as claimed in claim 10, wherein the controller is further configured to reduce a difference in the slip ratios among wheels to a predetermined value or less when the vehicle turns.

18. The driving force control system for the vehicle as claimed in claim 10, wherein the controller is further configured to
update the relations of the slip ratio to the driving force, the running resistance, and the accelerating force continuously during propulsion of the vehicle, and
control the driving force based on the updated relations.

* * * * *

UNITED STATES PATENT AND TRADEMARK OFFICE
CERTIFICATE OF CORRECTION

PATENT NO. : 11,952,009 B2
APPLICATION NO. : 17/683908
DATED : April 9, 2024
INVENTOR(S) : Kunihiko Usui and Keisuke Ushida It is certified that error appears in the above-identified patent and that said Letters Patent is hereby corrected as shown below:

In the Claims

In Column 12, Line(s) 43, Claim 10, delete "fora" and insert -- for a --, therefor.

Signed and Sealed this
Sixteenth Day of July, 2024

Katherine Kelly Vidal
*Director of the United States Patent and Trademark Office*